US011939880B1

(12) United States Patent
Vitt et al.

(10) Patent No.: US 11,939,880 B1
(45) Date of Patent: Mar. 26, 2024

(54) AIRFOIL ASSEMBLY WITH FLOW SURFACE

(71) Applicant: General Electric Company, Schenectady, NY (US)

(72) Inventors: Paul Hadley Vitt, Liberty Township, OH (US); Matthew Brian Surprenant, Stoneham, MA (US); Brian David Keith, Cincinnati, OH (US); Prem Venugopal, Clifton Park, NY (US); Thomas William Vandeputte, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/980,134

(22) Filed: Nov. 3, 2022

(51) Int. Cl.
*F01D 5/02* (2006.01)
*F01D 5/14* (2006.01)

(52) U.S. Cl.
CPC ................. *F01D 5/02* (2013.01); *F01D 5/14* (2013.01); *F05D 2220/30* (2013.01)

(58) Field of Classification Search
CPC ........... F01D 5/02; F01D 5/14; F05D 2220/30
See application file for complete search history.

(56) References Cited

U.S. PATENT DOCUMENTS 7,134,842 B2 11/2006 Tam et al.
7,220,100 B2 5/2007 Lee et al.
7,887,297 B2 * 2/2011 Allen-Bradley ........ F01D 5/143 416/193 A
8,105,037 B2 1/2012 Grover et al.
8,177,499 B2 5/2012 Iida
8,192,153 B2 * 6/2012 Harvey .................. F01D 5/143 416/243
8,356,975 B2 1/2013 Grover et al.
8,439,643 B2 5/2013 Kuhne et al.
8,926,267 B2 1/2015 Lee et al.
9,103,213 B2 8/2015 Barr et al.
9,638,041 B2 5/2017 Brozyna et al.
9,874,101 B2 1/2018 Xu
10,577,955 B2 3/2020 Shirley et al.
10,590,781 B2 3/2020 Correia et al.
10,890,072 B2 1/2021 Balzer
2007/0258810 A1 11/2007 Aotsuka et al.
2010/0158696 A1 * 6/2010 Pandey .................. F01D 5/145 416/243
2011/0123322 A1 5/2011 Allen-Bradley et al.
2013/0224027 A1 * 8/2013 Barr ....................... F01D 5/145 416/193 A

FOREIGN PATENT DOCUMENTS

EP 1688586 B1 7/2013

* cited by examiner

*Primary Examiner* — Shafiq Mian
*Assistant Examiner* — Dapinder Singh
(74) *Attorney, Agent, or Firm* — McGarry Bair PC

(57) ABSTRACT

A turbine engine stage includes a plurality of airfoils extending between an inner band and an outer band. Each airfoil in the plurality of airfoils can have an outer wall defining a pressure side and a suction side, with the outer wall extending between a leading edge and a trailing edge. An intervening flow passage is defined between two adjacent airfoils in the plurality of airfoils.

18 Claims, 8 Drawing Sheets

AIRFOIL ASSEMBLY WITH FLOW SURFACE

TECHNICAL FIELD

The disclosure generally relates to turbine engine airfoil assemblies, and more specifically to airfoil assemblies with contoured flow surfaces.

BACKGROUND

Turbine engines, and particularly gas or combustion turbine engines, are rotary engines that extract energy from a flow of combusted gases passing through the engine onto a multitude of rotating turbine blades.

A turbine engine can include, in serial flow arrangement, a forward fan assembly, an aft fan assembly, a compressor for compressing air flowing through the engine, a combustor for mixing fuel with the compressed air such that the mixture can be ignited, and a turbine. The compressor, combustor and turbine are sometimes collectively referred to as the core.

Turbine engines include several components that utilize airfoils. By way of a non-limiting example, the airfoils can be located in the engine turbines, compressors, or fans. Stationary airfoils are often referred to as vanes and rotating airfoils are often referred to as blades.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
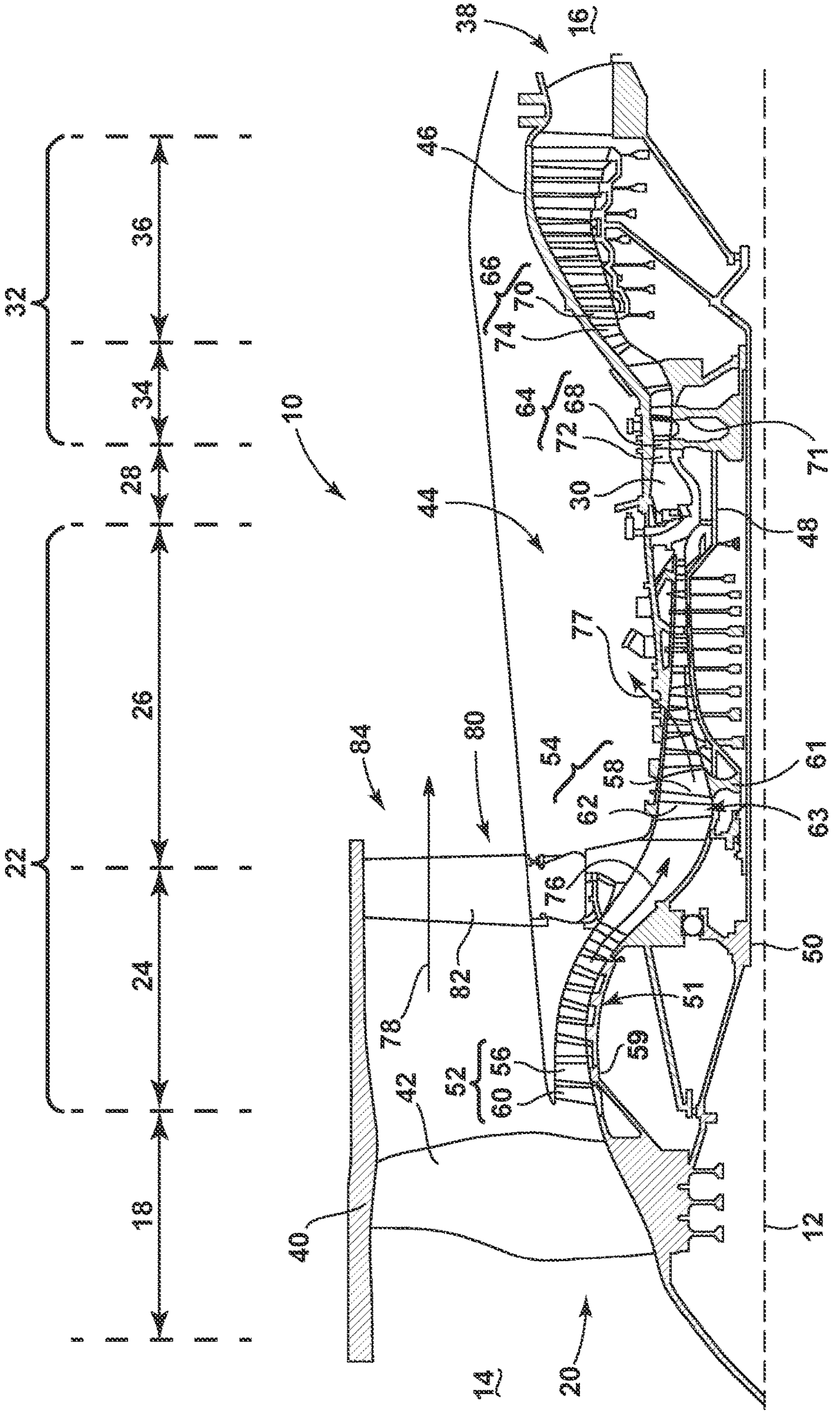
FIG. 1 is a schematic cross-sectional diagram of a turbine engine for an aircraft.

The described embodiments of the present disclosure are directed to a flow surface in a stage of a turbine engine. For purposes of illustration, the present disclosure will be described with respect to a turbine section of a gas turbine engine. It is understood that the disclosure is not so limited and may have general applicability within an engine, including in compressors, as well as in non-aircraft applications, such as other mobile applications and non-mobile industrial, commercial, and residential applications.

A gap or cavity between flow path components in a turbine engine typically contains materials that are sensitive to high temperatures, and it is beneficial to purge such cavities with cooler air. The cavity purge pressure is set by the inner- or outer-band static pressure in the gas flow path. These gaps are subject to pressure variations in the flow path, such as a bow wave that emanates from the lead edge of flow path obstructions such as airfoils. The bow wave generates a locally high pressure which can result in ingestion of hot gases into the cavity that contains temperature-sensitive materials.

The bow wave strength and broadcast is generally driven by the flow path approach velocity and airfoil lead-edge diameter. The approach velocity and lead-edge diameter are typically designed for optimal aerodynamic performance, and therefore other methods are often evaluated to reduce bow wave broadcast for a given aerodynamic design.

Aspects of the disclosure provide for a reduction in pressure variances and forward broadcast of a bow wave from an airfoil leading edge by the placement of a lowered-flowpath region or trough in the platform forward of the airfoil lead edge, and a raised-flowpath region or bulge proximate the lead edge and extending slightly into the intervening flow passage. Bow wave mitigation can include locally raising the flowpath into the gas stream by way of a bulge positioned between the airfoil leading edges. Such a bulge increases the local pressure proximate or upstream of the bulge by shifting radial streamline curvatures into the main stream. Bow wave mitigation can also include locally depressing the flowpath proximate the leading edge by way of a trough. Such a trough lowers static pressure proximate or upstream of the trough by shifting radial streamlines away from the main stream. This combination of effects works to offset a circumferential pressure gradient introduced by the bow wave.

Aspects of the disclosure also provide for a reduction or elimination of ingestion of hot gases into the cavities between flow path components and therefore allow the flow path axial lengths to be reduced, resulting in weight savings and lower frictional losses. Aspects of the disclosure further provide for maintaining or reducing aerodynamic losses through the flow passage, as well as reduction of secondary flow development in the flow passage.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
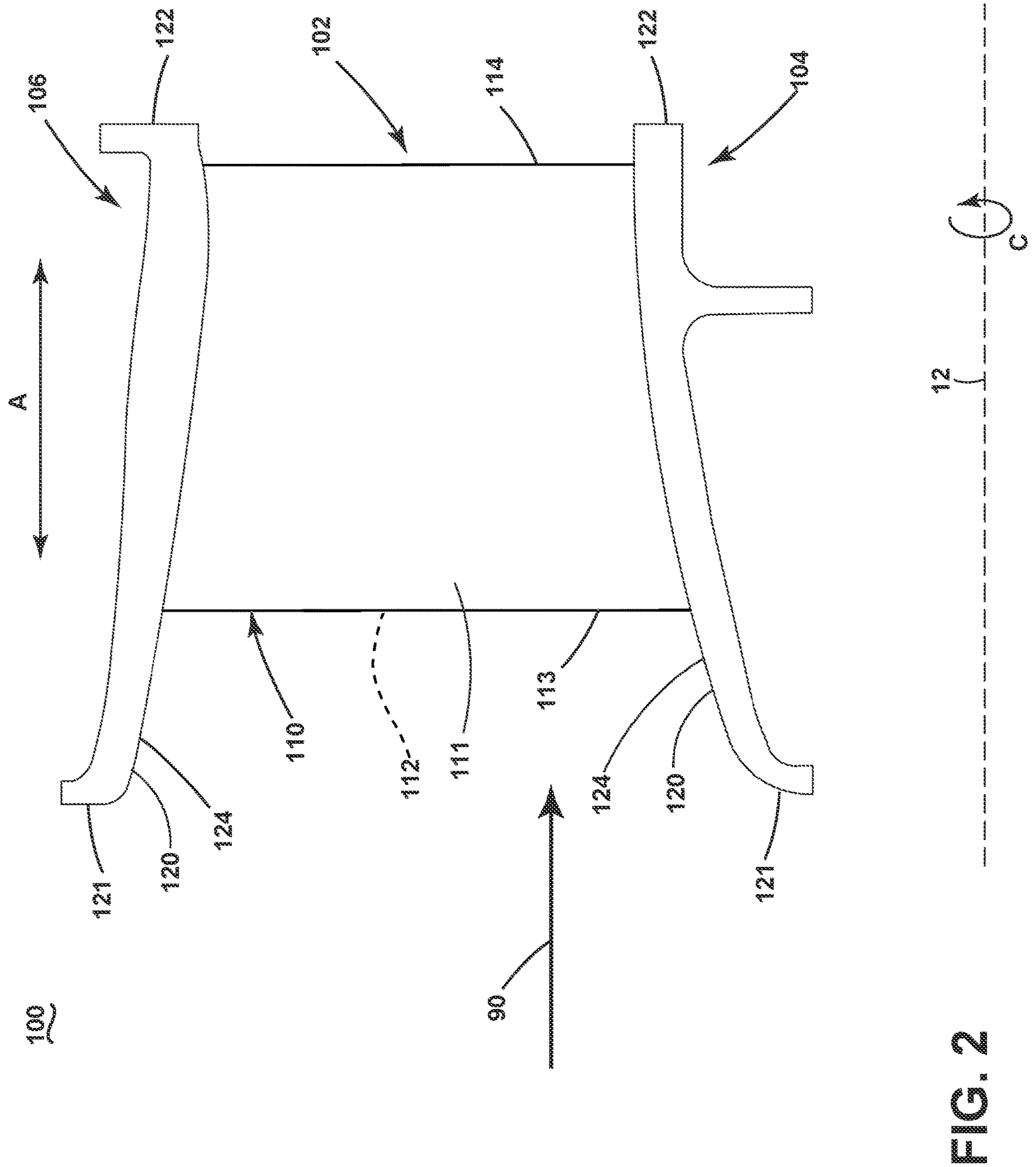
FIG. 2 is a schematic side view of an exemplary airfoil assembly that can be utilized in the turbine engine of FIG. 1 illustrating a baseline flow surface.

Turning to FIG. 2, one exemplary airfoil assembly 100 is shown that can be utilized in the turbine engine 10 (FIG. 1). As shown, the airfoil assembly 100 includes an airfoil 102 extending radially between an inner band 104 and an outer band 106 though this need not be the case. In some implementations, the airfoil assembly 100 can include a rotatable blade extending radially from a single platform. It is understood that the airfoil assembly 100 can include any rotating or non-rotating airfoil within the engine 10, including any one or more of the blades 56, 58, 68, 70 or vanes 60, 62, 72, 74 in the compressor section 22 or the turbine section 32.

At least one of the inner band 104 or the outer band 106 can include a platform. In the example shown, each of the inner band 104 and the outer band 106 define a baseline platform 120. Each baseline platform 120 can extend axially between a forward edge 121 and an aft edge 122. An axial direction A is indicated between the forward and aft edges 121, 122. A circumferential direction C is also indicated about the engine centerline 12.

The airfoil 102 includes an outer wall 110 defining a pressure side 111 and a suction side 112, and also extends between a leading edge 113 and a trailing edge 114. It is also understood that a span-wise direction can be defined along the leading edge 113 between the inner and outer bands 104, 106, and a chord-wise direction can be defined between the leading edge 113 and the trailing edge 114. The chord-wise direction can be aligned or unaligned with the axial direction A.

In the example shown, the baseline platform 120 defines an axisymmetric baseline surface 124 (herein "baseline surface 124"). As used herein, an "axisymmetric" surface or profile will refer to a geometric surface profile having a constant surface height or topography in the circumferential direction C. It is understood that such an axisymmetric surface can include an axial variance in surface height, e.g. along the axial direction A. As shown, the baseline surface 124 generally rises from the forward edge 121 to the aft edge 122 though this need not be the case.

When assembled, the leading edge 113 of the airfoil 102 can be positioned aft of the forward edge 121 of the baseline platform 120. During operation, a working airflow enters the airfoil assembly 200 and flows along the baseline surfaces 124. The working airflow 90 can include a compressed airflow or a combustion gas flow in non-limiting examples.

In examples where the working airflow 90 is a hot/combustion gas flow, bow waves can be generated proximate the leading edge 113 and form circumferential pressure gradients over the baseline surface 124. Such pressure gradients can cause flow separation from the airfoils 102 and corresponding aerodynamic losses from the working airflow 90. Such pressure gradients can also cause hot gas ingestion into an upstream cavity or gap adjacent the forward edge 121, such as a gap between the airfoil assembly 100 and an upstream combustor liner, platform, or other engine component.

Figure 3:
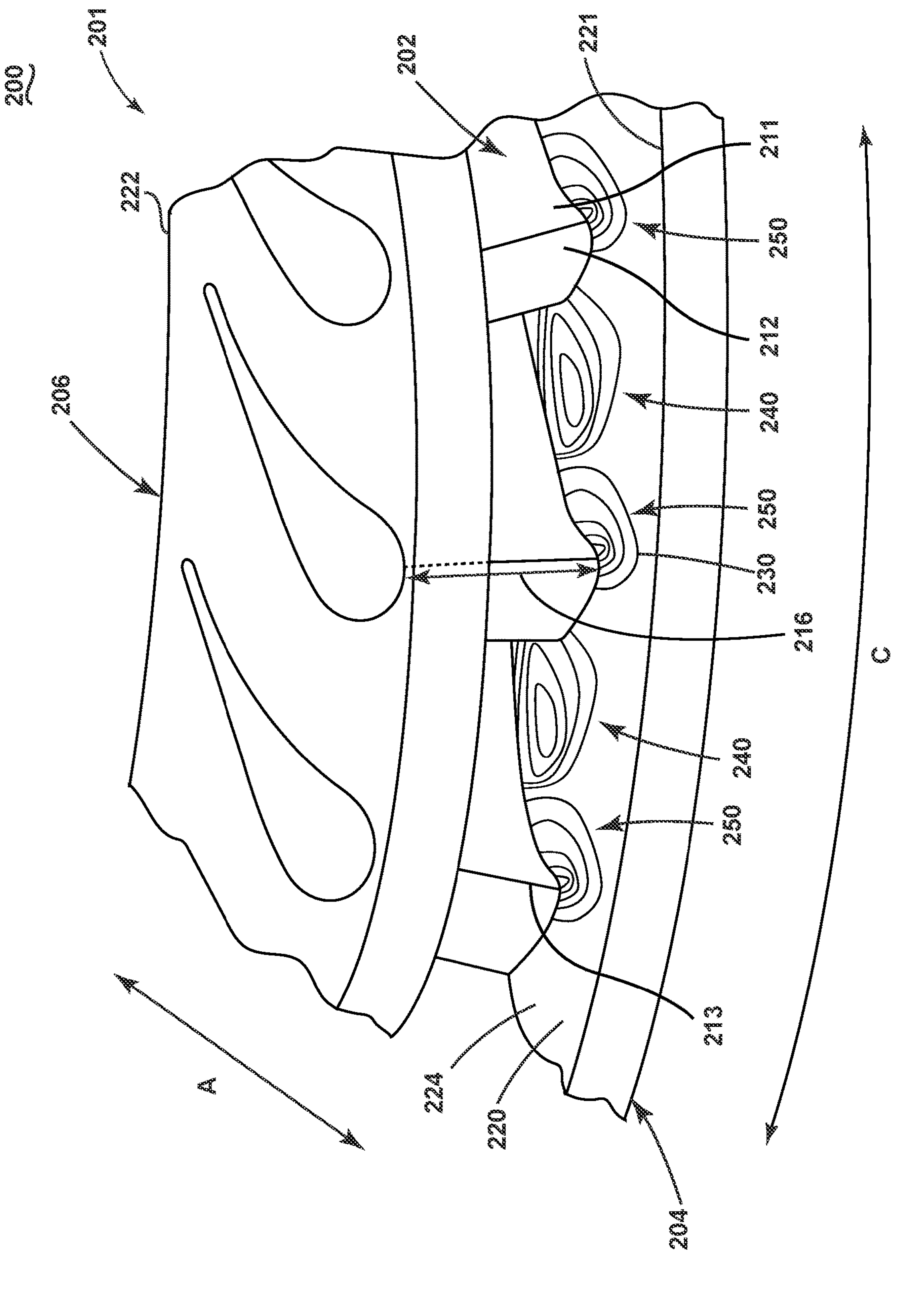
FIG. 3 is a perspective view of a turbine engine stage that can be utilized in the turbine engine of FIG. 1 in accordance with various aspects described herein.

Turning to FIG. 3, another airfoil assembly 200 is illustrated that can be utilized in the turbine engine 10. The airfoil assembly 200 is similar to the airfoil assembly 100; therefore, like parts will be identified with like numerals increased by 100, with it being understood that the description of the like parts of the airfoil assembly 100 applies to the airfoil assembly 200, except where noted.

The airfoil assembly 200 includes a turbine engine stage 201 having a plurality of airfoils 202 extending radially between an inner band 204 and an outer band 206. Each airfoil 202 includes an outer wall 210 defining a pressure side 211 and a suction side 212, and also extends between a leading edge 213 and a trailing edge 214 (visible in FIG. 4). Each of the inner band 204 and outer band 206 includes a platform 220 similar to the platform 220. The platform 220 includes a forward edge 221, and an aft edge 222.

A span-wise length 216 is indicated for the airfoils 202. As shown, the span-wise length 216 is defined between the inner band 204 and the outer band 206 along the leading edge 213. In another exemplary implementation where the airfoil assembly includes a rotatable blade extending from a platform between a root and a tip, the span-wise length 216 can be defined between the root and the tip.

One difference compared to the airfoil assembly 100 is that the platform 220 includes a contoured flow surface 224 having a non-axisymmetric surface profile. As used herein, a "non-axisymmetric" surface profile will refer to a geometric surface profile having a varied surface height or topography in the circumferential direction C.

Some exemplary contour lines 230 illustrate a topography of the contoured flow surface 224 relative to the baseline surface 124 of FIG. 2. It will be understood that contour lines 230 as used herein demarcate regions of differing flow surface height along the platform between local maxima and local minima, and are provided to indicate exemplary changes in height at different locations along the platform 220. The height of the flow surface can change in a region between contour lines, including with a continuous or non-continuous rate of change. The lack of an illustrated contour line in a region should not be limited to mean the flow surface height does not change in that region, as certain contour lines may have been omitted for clarity of illustration.

In the example shown, bulges 240 and troughs 250 are shown on the contoured flow surface 224 of the inner band 204. Any number of bulges 240 or troughs 250 can be provided. It is understood that the contoured flow surface 224 and contour lines 230 can be provided on either or both of the inner band 204 or the outer band 206. In addition, while not shown in FIG. 3, it is understood that fillets or other surface-interface features between the airfoil 202 and platform 220 can be provided. In one exemplary implementation, the at least one bulge 240 and at least one trough 250 can be formed in the contoured flow surface 224 prior to forming fillets, such that fillets can be incorporated into any intersecting bulges 240 or troughs 250 as desired.

It is contemplated that the forward edge 221 of the platform 220 can have an axisymmetric geometric profile, such that no bulges 240 or troughs 250 extend to the forward edge 221. In this manner, each bulge 240 and trough 250 can be positioned aft of the forward edge 221 of the platform 220.

Figure 4:
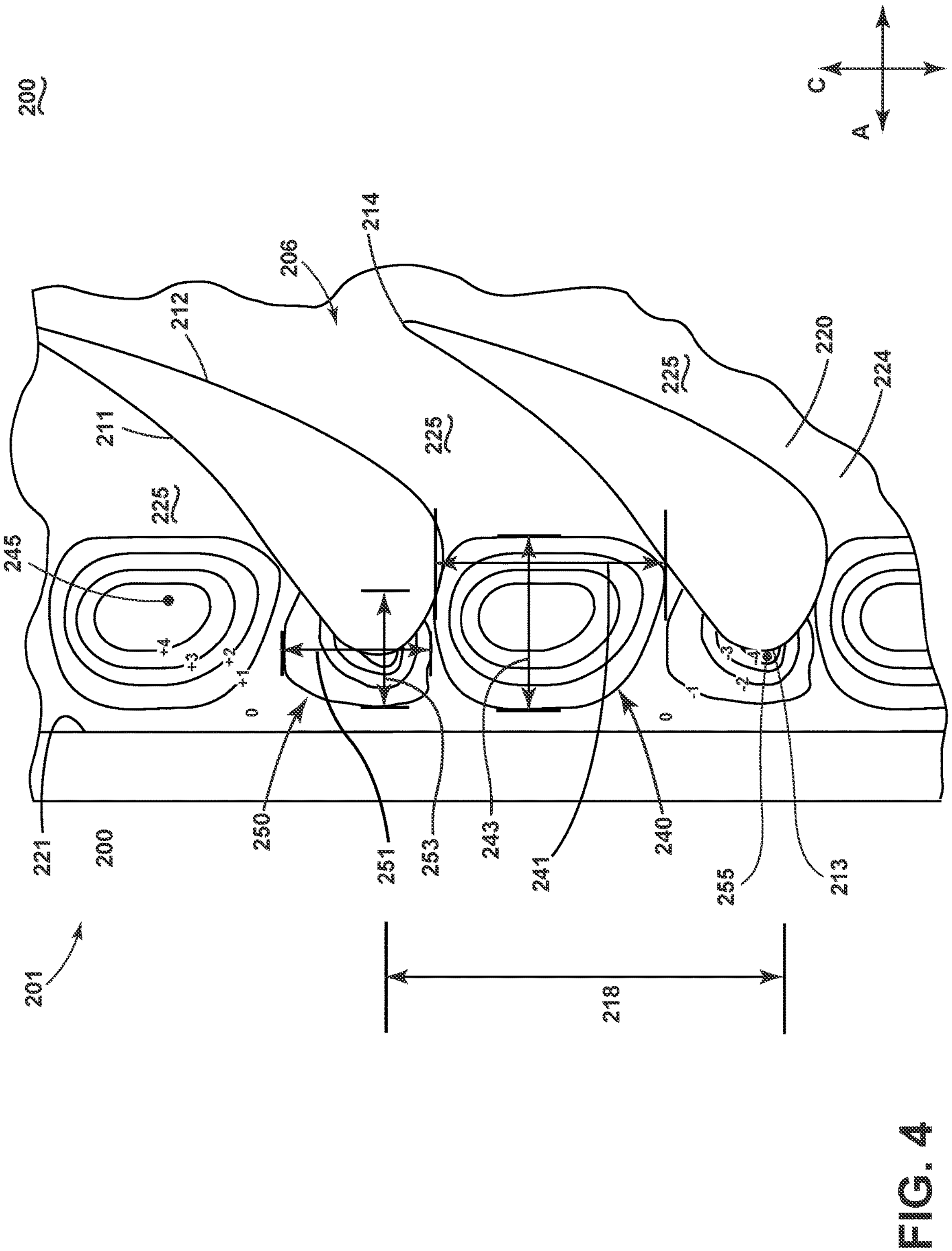
FIG. 4 is a bottom view of the turbine engine stage of FIG. 3 illustrating a contoured flow surface having a bulge and a trough in accordance with various aspects described herein.

FIG. 4 is a bottom view of the turbine engine stage 201 illustrating the airfoils 202 and the outer band 206 with contoured flow surface 224. The axial direction A and the circumferential direction C are indicated. It is understood that aspects of the disclosure can be applied to the inner band 204 (FIG. 3) as well.

The exemplary contour lines 230 are shown with numeric values indicating changes in surface height relative to the baseline surface 124. A "0" contour as used herein will refer to a surface height corresponding to the baseline surface 124 at the location of that contour. A negative contour indicates a trough, valley, or the like wherein the surface height is below the baseline surface 124. A positive contour indicates a bulge, protrusion, or the like wherein the surface height is above the baseline surface 124.

An airfoil spacing distance 218 can be defined between two adjacent airfoils 202. The airfoil assemblies 200 can collectively form an annular row with the airfoils 102 circumferentially spaced apart to define intervening flow passages 225. As shown, bulges 240 can be located within corresponding intervening flow passage 225, and troughs 250 can be located proximate corresponding leading edges 213 of the airfoils 202.

The trough 250 can extend along at least a portion of the pressure side 211. The bulge can extend along at least a portion of the pressure side 211. As shown, the bulge 240 extends circumferentially within the intervening flow passage 225 and abuts each of the two adjacent airfoils 102. In such a case, a single airfoil 202 can have bulges 240 extending along at least a portion of the pressure side 211 and the suction side 212. In some exemplary implementations, the bulge 240 can terminate on the platform 220 without contacting either or both of the adjacent airfoils 202.

The bulge 240 can have a local maximum 245, and the trough 250 can have a local minimum 255. The local maximum 245 can be located aft of the local minimum 255. The local maximum 245 can be located within the intervening flow passage 225 and spaced from the outer wall 210.

The local minimum 255 can be positioned proximate the leading edge 213. For instance, the local minimum 255 can abut the leading edge 213, or be positioned forward of the leading edge 213. In some examples, the local minimum 255 can be spaced from the leading edge 213 by between 0-20% of the airfoil spacing distance 218. It is also contemplated that a portion of the trough 250 can extend or wrap around the leading edge 213 from the pressure side 211 to the suction side 212, though this need not be the case. In some examples, the local minimum 255 can terminate at the leading edge 213 without extending around to the suction side 212. In some examples, the trough 250 can terminate at the leading edge 213 without extending around to the suction side 212. In this manner, the trough 250 can be biased toward the pressure side 211.

In addition, the bulge 240 can define a first circumferential width 241 and a first axial width 243. The trough 250 can define a second circumferential width 251 and a second axial width 253. The second circumferential width 251 of the trough 250 can be less than the first circumferential width 241 of the bulge. In addition, the second axial width 253 of the trough 250 can be less than the first axial width 243 of the bulge 240.

Figure 5:
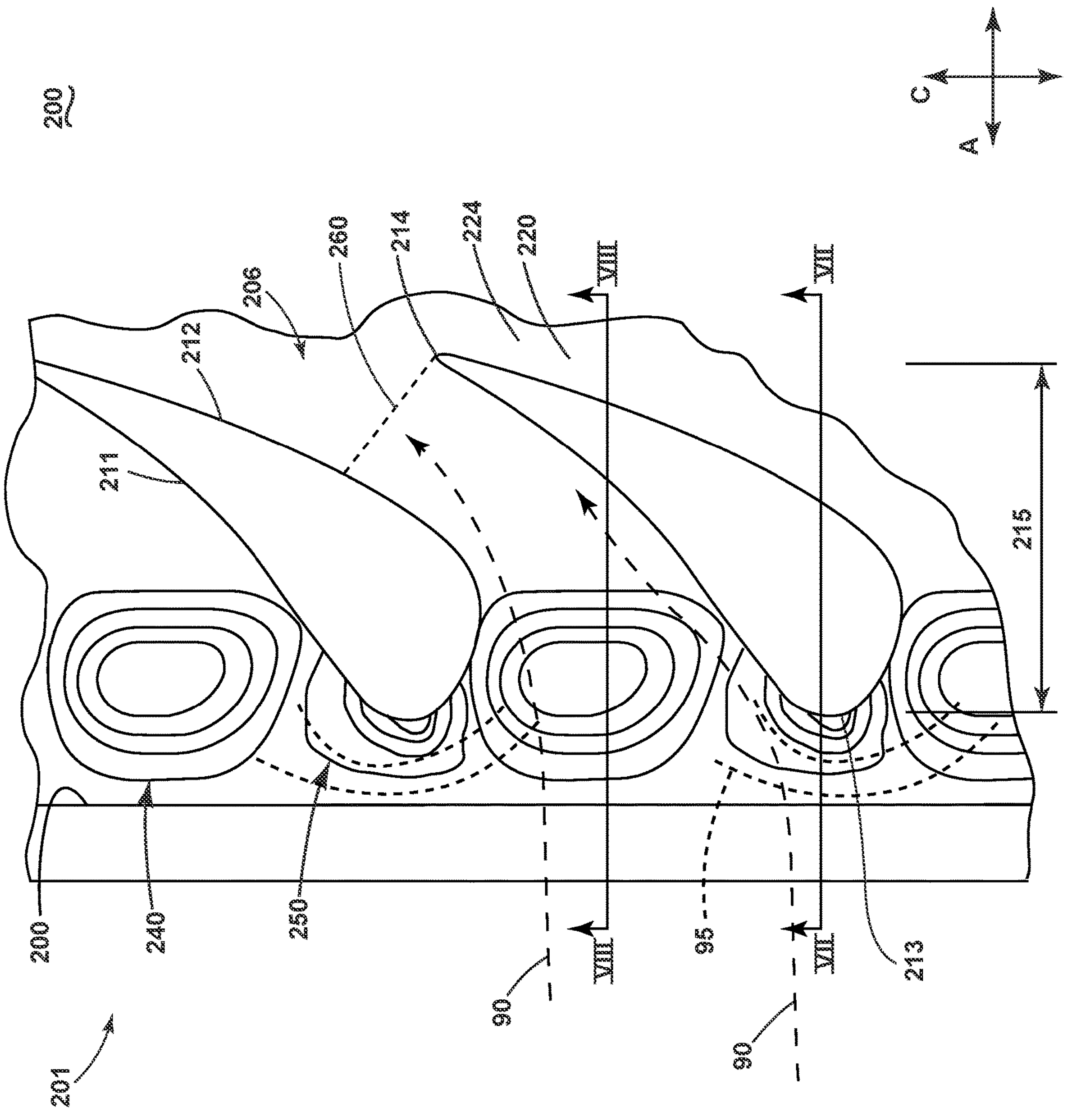
FIG. 5 is a bottom view of the turbine engine stage of FIG. 3 illustrating airflows along the contoured flow surface.

FIG. 5 illustrates additional details of the turbine engine stage 201. A throat 260 is shown indicating a minimum cross-sectional flow area between two adjacent airfoils 202. At least one of the bulge 240 or the trough 250 can be positioned forward of the throat 260. As shown, the bulge 240 and trough 250 are each located forward of the throat 260. In this manner, the contoured flow surface 224 can have local contours positioned in a forward region of the platform 220 upstream of the throat 260 to direct airflows into the intervening flow passages 225.

In addition, each airfoil 202 can further define an axial chord 215 between the leading edge 213 and trailing edge 214 along the axial direction A. It is contemplated that at least one of the bulge 240 or trough 250 can terminate on the platform 220 at a predetermined axial location with respect to the axial chord 215. In one exemplary implementation, the bulges 240 and troughs 250 can terminate on the platform 220 between 25-40% of the axial chord 215.

Some exemplary working airflows 90 are shown moving through the turbine engine stage 201. In addition, some exemplary bow waves 95 are illustrated in front of the leading edges 213 of each airfoil 202. It is understood that the bow waves 95 form local increases in pressure in the working airflow 90 adjacent each leading edge 213. It is also understood that the illustrated bow waves 95 represent one exemplary geometric profile, and that geometric profiles of each bow wave 95 can vary in different regions of the turbine engine stage 201.

Figure 6:
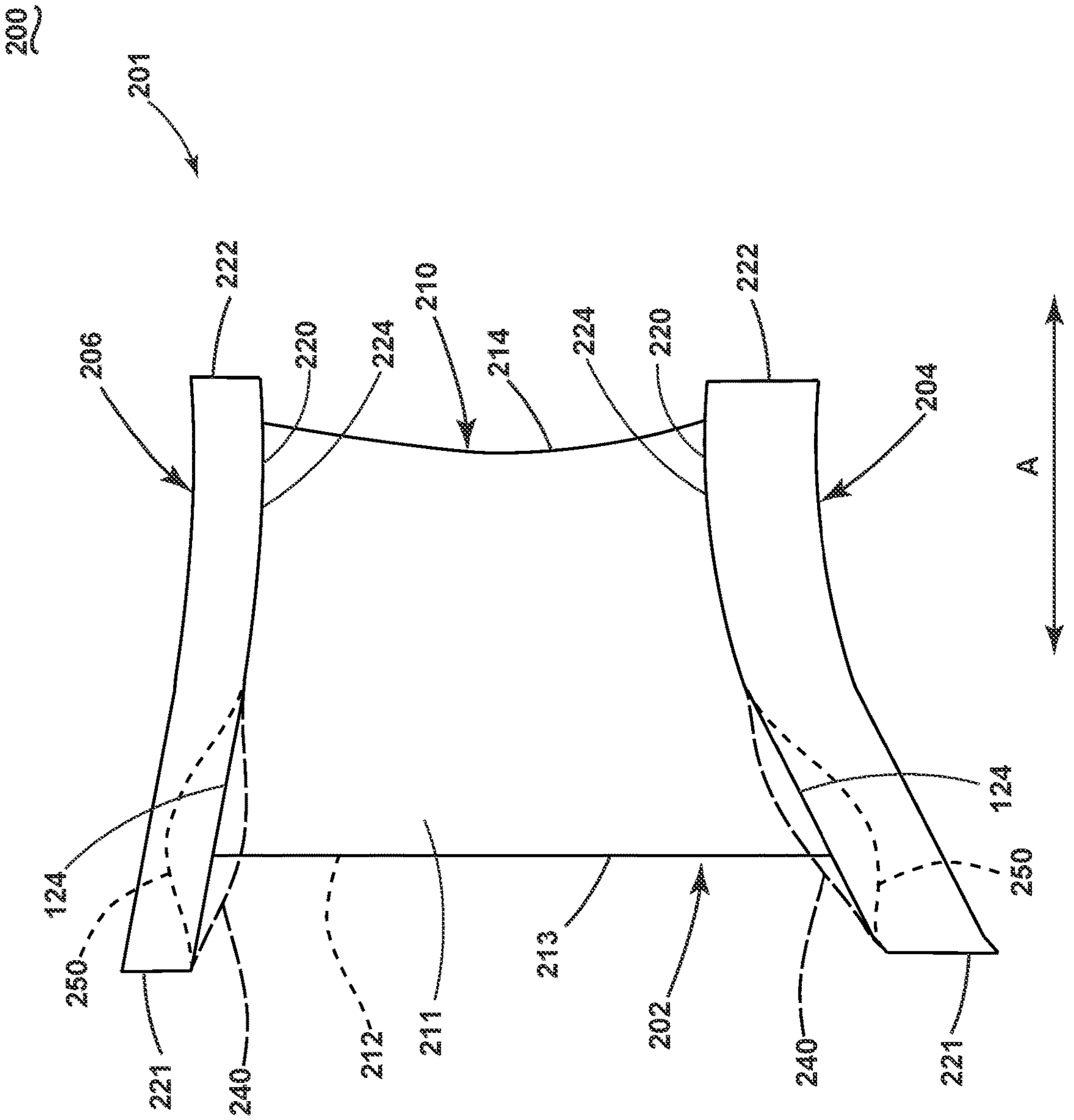
FIG. 6 is a schematic circumferential view of the turbine engine stage of FIG. 3 illustrating the bulge and the trough relative to the baseline flow surface of FIG. 2.

The bulges 240 and troughs 250 can be formed, selected, arranged, or the like to tailor or counteract local pressure differences caused by the bow waves 95. Referring now to FIG. 6, a schematic circumferential view of the turbine engine stage 201 illustrates the platforms 220 with the contoured flow surface 224 relative to the baseline surface 124, and with multiple surface features visually overlaid. The airfoil 202, the inner band 204, the outer band 206, and the platforms 220 are illustrated with solid lines.

Portions of the platforms 220 having the bulge 240 and trough 250 are each illustrated in dashed line. The baseline surface 124 in the region of the bulge 240 and trough 250 is illustrated with solid line. It is contemplated that either or both of the bulge 240 or trough 250 can extend along the platform 220 aft of the leading edge 213 with respect to the axial direction A.

Figure 7:
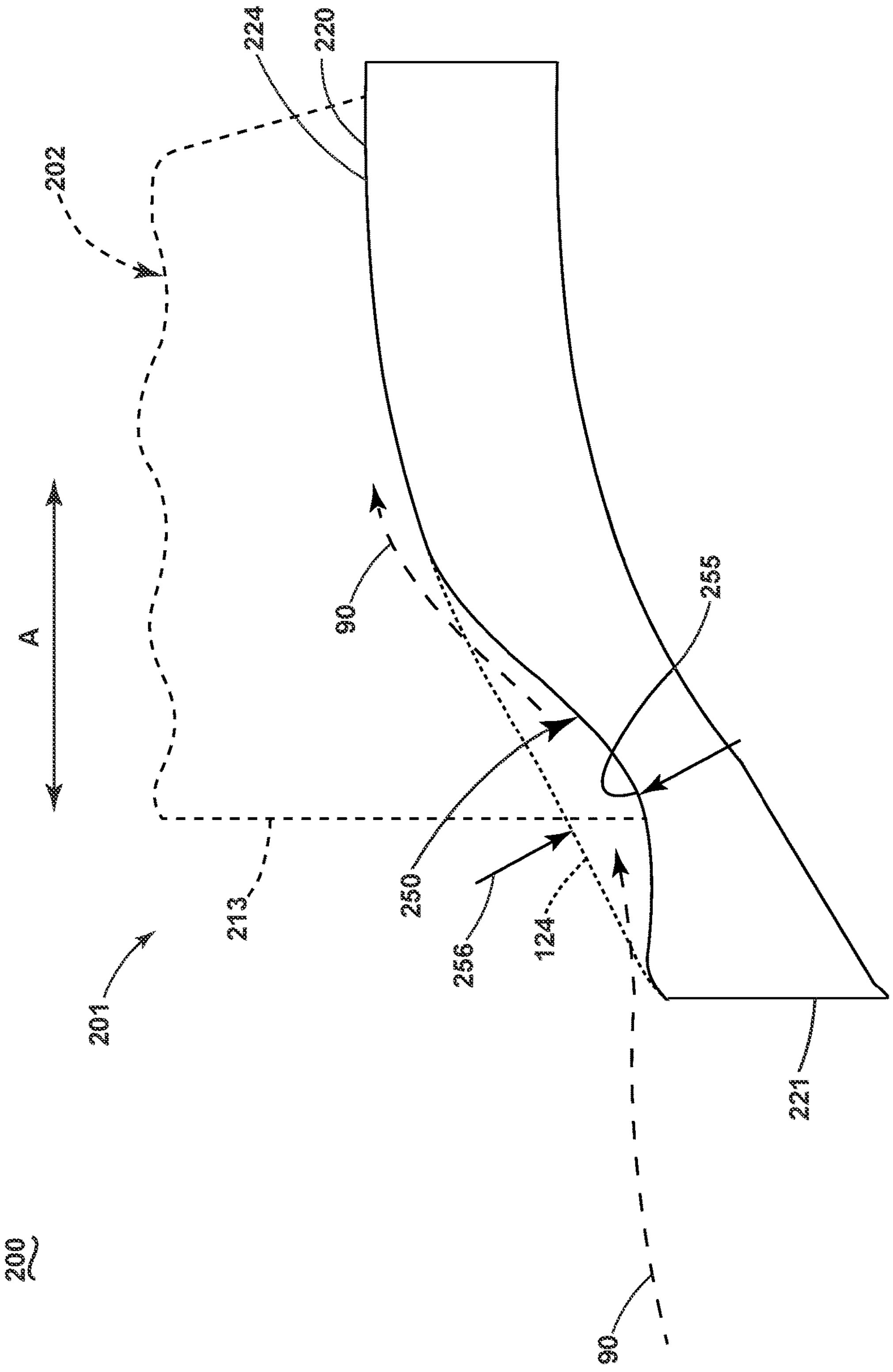
FIG. 7 is a schematic circumferential view of the turbine engine stage of FIG. 3 taken at line VII-VII of FIG. 5 and illustrating the trough.

FIG. 7 illustrates a schematic circumferential view of the turbine engine stage 201 at location VII-VII of FIG. 5. The outer band 206 (FIG. 6) is omitted for visual clarity. It is understood that aspects of the disclosure can be applied to the outer band 206 or inner band 204.

The contoured flow surface 224 is illustrated in solid line and includes the trough 250. The baseline surface 124 is indicated in dashed line for reference. The local minimum 255 can define a trough depth 256 with respect to the baseline surface 124. As shown, the trough depth 256 is defined orthogonally to the baseline surface 124 such that the local minimum 255 represents a maximum deviation of the trough 250 from the baseline surface 124.

The trough depth 256 can be proportional to either or both of the span-wise length 216 (FIG. 3) or the airfoil spacing distance 218 (FIG. 4). For instance, the trough depth 256 can be between 1-10% of the span-wise length 216, or between 5-10% of the span-wise length 216, or between 3-8% of the span-wise length 216, or between 1-10% of the airfoil spacing distance 218, or between 5-9% of the airfoil spacing distance 218, or between 3-7% of the airfoil spacing distance 218, in non-limiting examples.

Figure 8:
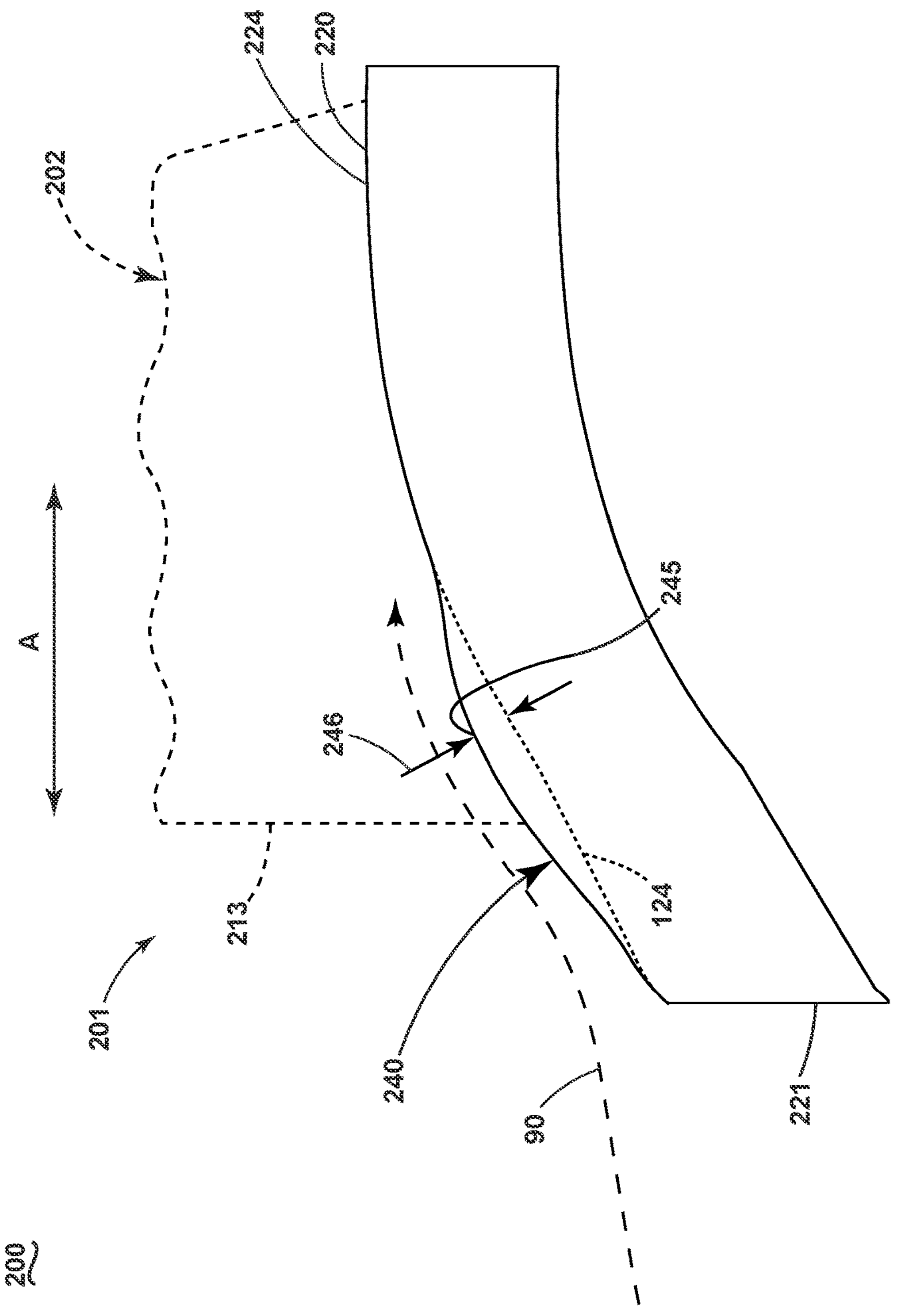
FIG. 8 is a schematic circumferential view of the turbine engine stage of FIG. 3 taken at line VIII-VIII of FIG. 5 and illustrating the bulge.

FIG. 8 illustrates a schematic circumferential view of the turbine engine stage 201 at location VIII-VIII of FIG. 5. The outer band 206 (FIG. 5) is omitted for visual clarity. It is understood that aspects of the disclosure can be applied to the outer band 206 or inner band 204.

The contoured flow surface 224 is illustrated in solid line and includes the bulge 240. The baseline surface 124 is indicated in dashed line for reference. The local maximum 245 can define a bulge height 246 with respect to the baseline surface 124. As shown, the bulge height 246 is defined orthogonally to the baseline surface 124 such that the local maximum 245 represents a maximum deviation of the bulge 240 from the baseline surface 124.

The bulge height 246 can be proportional to either or both of the span-wise length 216 (FIG. 3) or the airfoil spacing distance 218 (FIG. 6). For instance, the bulge height 246 can be between 1-20% of the span-wise length 216, or between 10-20% of the span-wise length 216, or between 2-5% of the span-wise length 216, or between 3-3.7% of the span-wise length 216, or between 1-15% of the airfoil spacing distance 218, or between 3-6% of the airfoil spacing distance 218, or between 4.6-6.8% of the airfoil spacing distance 218, in non-limiting examples. It is also contemplated that the bulge height 246 can be smaller than the trough depth 256 (FIG. 4).

Referring generally to FIGS. 3-8, during operation, the working airflow 90 can flow toward the turbine engine stage 201, where the bow waves 95 can form a circumferential pressure gradient with locally-higher air pressures at the leading edges 213 of each airfoil 202 and locally-lower air pressures between the airfoils 202. A portion of the working airflow 90 can flow into the trough 250 and at least along the pressure side 211 of the airfoils 202. Another portion of the working airflow 90 can flow around the bulge 240 and be directed toward adjacent outer walls 210 of adjacent airfoils 202. The troughs 250 can form a locally-smaller air pressure in front of the leading edge 213, as streamlines along the contoured flow surface 224 are deviated away from central streamlines through the airfoil assembly 200. The bulges 240 can form a locally-larger air pressure between the airfoils 202, as streamlines along the contoured flow surface 224 are deviated toward central streamlines through the airfoil 200. In this manner, the bulges 240 and troughs 250 can counteract the circumferential pressure gradients formed by bow waves during operation.

Aspects of the disclosure provide for multiple benefits, including control of local air pressures in the stages to tailor local airflows around the airfoils. The use of a spaced bulge and trough as described herein can guide working airflows closer to each airfoil near the upstream end of each intervening flow passage, which can increase the work extracted by the airfoils and reduce secondary flow vortices along the flow path. Aspects further provide for increased engine efficiency and reductions in fuel consumption during operation.

The use of a trough positioned forward of the airfoil leading edge and spaced from the bulge as described herein additionally provides for a reduction in circumferential pressure gradient due to upstream bow waves. In one example, the contoured flow surface described herein can provide for a reduction in circumferential pressure gradient by 50% compared to an axisymmetric platform flow surface. Furthermore, aspects of the contoured flow surface can prevent hot gas ingestion into a gap or cavity upstream of the forward edge of the platform.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. In addition, the bulges, local maxima, troughs, and local minima illustrated herein are intended to show exemplary positions along the platform, and it will be understood that combinations of height, depth, shape, profile, and location are contemplated for use in this disclosure. All combinations or permutations of features described herein are covered by this disclosure.

It should be understood that application of the disclosed design is not limited to turbine engines with fan and booster sections/turbines, but is applicable to turbojets and turboshaft engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the present disclosure are provided by the subject matter of the following clauses:

A turbine engine stage for at least one of a compressor or a turbine, the turbine engine stage comprising: a plurality of airfoils extending between an inner band and an outer band, each airfoil in the plurality of airfoils having an outer wall defining a pressure side and a suction side, with the outer wall extending between a leading edge and a trailing edge; and an intervening flow passage defined between two adjacent airfoils in the plurality of airfoils; wherein at least one of the inner band or the outer band includes a platform extending along an axial direction between a forward edge and an aft edge, with the platform having a contoured flow surface comprising: a trough extending along at least a portion of the pressure side and having a local minimum proximate the leading edge; and a bulge having a local maximum and extending along at least a portion of the suction side; wherein each of the bulge and the trough are positioned aft of the forward edge of the platform.

The turbine engine stage of any preceding clause, wherein the local maximum is spaced from the outer wall.

The turbine engine stage of any preceding clause, wherein the local maximum is located aft of the local minimum.

The turbine engine stage of any preceding clause, wherein the bulge defines a first axial width and the trough defines a second axial width less than the first axial width.

The turbine engine stage of any preceding clause, wherein the bulge defines a first circumferential width and the trough defines a second circumferential width less than the first circumferential width.

The turbine engine stage of any preceding clause, wherein a portion of the trough extends from the pressure side around the leading edge to the suction side.

The turbine engine stage of any preceding clause, further comprising a throat defined in the intervening flow passage, with each of the bulge and the trough located forward of the throat.

The turbine engine stage of any preceding clause, wherein the bulge extends circumferentially within the intervening flow passage.

The turbine engine stage of any preceding clause, wherein the bulge abuts each of the two adjacent airfoils.

The turbine engine stage of any preceding clause, further comprising: an axisymmetric baseline surface defined along the platform between the forward edge and the aft edge; an airfoil spacing distance defined circumferentially between corresponding leading edges of the two adjacent airfoils in the plurality of airfoils; and a span-wise length defined along one of the two adjacent airfoils between the inner band and the outer band.

The turbine engine stage of any preceding clause, wherein the local minimum is spaced from the leading edge by between 0-20% of the airfoil spacing distance.

The turbine engine stage of any preceding clause, wherein the local minimum defines a trough depth with respect to the axisymmetric baseline surface, and the local maximum defines a bulge height with respect to the axisymmetric baseline surface.

The turbine engine stage of any preceding clause, wherein at least one of the trough depth or the bulge height is between 1-20% of the span-wise length.

The turbine engine stage of any preceding clause, wherein the bulge height is between 2-5% of the span-wise length, and the trough depth is between 3-8% of the span-wise length.

An airfoil assembly for a turbine engine, comprising: an airfoil having an outer wall defining a pressure side and a suction side and extending between a leading edge and a trailing edge; and a platform extending along an axial direction between a forward edge and an aft edge, the airfoil extending radially from the platform with the leading edge positioned aft of the forward edge of the platform, and with the platform having a contoured flow surface comprising: a trough extending along at least a portion of the pressure side and having a local minimum proximate the leading edge; a bulge having a local maximum and extending along at least a portion of the suction side; wherein each of the bulge and the trough are positioned aft of the forward edge of the platform.

The airfoil assembly of any preceding clause, wherein a portion of the trough extends around the leading edge to the suction side.

The airfoil assembly of any preceding clause, wherein the local maximum is spaced from the outer wall of the airfoil.

The airfoil assembly of any preceding clause, wherein the local maximum is located aft of the local minimum.

The airfoil assembly of any preceding clause, wherein the bulge defines a first axial width and the trough defines a second axial width less than the first axial width.

The airfoil assembly of any preceding clause, wherein the bulge defines a first circumferential width and the trough defines a second circumferential width less than the first circumferential width.

The airfoil assembly of any preceding clause, further comprising a span-wise length defined along the leading edge between a root and a tip of the airfoil.

The airfoil assembly of any preceding clause, wherein at least one of the trough depth or the bulge height is between 1-20% of the span-wise length.

The airfoil assembly of any preceding clause, wherein the bulge height is between 2-5% of the span-wise length, and the trough depth is between 3-8% of the span-wise length.

What is claimed is:

1. A turbine engine stage for at least one of a compressor or a turbine, the turbine engine stage comprising:

a plurality of airfoils extending between an inner band and an outer band, each airfoil in the plurality of airfoils having an outer wall defining a pressure side and a suction side, with the outer wall extending between a leading edge and a trailing edge; and an intervening flow passage defined between a first airfoil and a second airfoil in the plurality of airfoils;

wherein at least one of the inner band or the outer band includes a platform extending along an axial direction between a forward edge and an aft edge, with the platform having a contoured flow surface comprising:

a trough extending along at least a portion of the pressure side of the first airfoil and having a local minimum proximate the leading edge of the first airfoil; and a bulge positioned in the intervening flow passage and having a local maximum spaced from each of the first airfoil and the second airfoil;

wherein each of the bulge and the trough are positioned aft of the forward edge of the platform.

2. The turbine engine stage of claim 1, wherein the local maximum is located aft of the local minimum.

3. The turbine engine stage of claim 1, wherein the bulge defines a first axial width and the trough defines a second axial width less than the first axial width.

4. The turbine engine stage of claim 1, wherein the bulge defines a first circumferential width and the trough defines a second circumferential width less than the first circumferential width.

5. The turbine engine stage of claim 1, wherein a portion of the trough extends from the pressure side of the first airfoil around the leading edge to the suction side of the first airfoil.

6. The turbine engine stage of claim 1, further comprising a throat defined in the intervening flow passage, with each of the bulge and the trough located forward of the throat.

7. The turbine engine stage of claim 1, wherein the bulge extends circumferentially within the intervening flow passage.

8. The turbine engine stage of claim 7, wherein the bulge abuts each of the first airfoil and the second airfoil.

9. The turbine engine stage of claim 1, further comprising:

an axisymmetric baseline surface defined along the platform between the forward edge and the aft edge;

an airfoil spacing distance defined circumferentially between the leading edge of the first airfoil and the leading edge of the second airfoil; and a span-wise length defined along the first airfoil between the inner band and the outer band.

10. The turbine engine stage of claim 9, wherein the local minimum is spaced from the leading edge of the first airfoil by between 0-20% of the airfoil spacing distance.

11. The turbine engine stage of claim 9, wherein the local minimum defines a trough depth with respect to the axisymmetric baseline surface, and the local maximum defines a bulge height with respect to the axisymmetric baseline surface.

12. The turbine engine stage of claim 11, wherein at least one of the trough depth or the bulge height is between 1-20% of the span-wise length.

13. The turbine engine stage of claim 12, wherein the bulge height is between 2-5% of the span-wise length, and the trough depth is between 3-8% of the span-wise length.

14. An airfoil assembly for a turbine engine, comprising:

an airfoil having an outer wall defining a pressure side and a suction side and extending between a leading edge and a trailing edge; and a platform extending along an axial direction between a forward edge and an aft edge, the airfoil extending radially from the platform, and with the platform having a contoured flow surface comprising:

a trough extending along at least a portion of the pressure side and having a local minimum proximate the leading edge; and a bulge having a local maximum spaced from the outer wall and extending along at least a portion of the suction side;

wherein each of the bulge and the trough are positioned aft of the forward edge of the platform.

15. The airfoil assembly of claim 14, wherein a portion of the trough extends around the leading edge to the suction side.

16. The airfoil assembly of claim 14, wherein the local maximum is located aft of the local minimum.

17. The airfoil assembly of claim 14, wherein the bulge defines a first axial width and the trough defines a second axial width less than the first axial width.

18. The airfoil assembly of claim 14, wherein the bulge defines a first circumferential width and the trough defines a second circumferential width less than the first circumferential width.

* * * * *